Dec. 24, 1946.　　　LE ROY VAUGHT　　　2,413,089
FITTING
Filed July 10, 1944
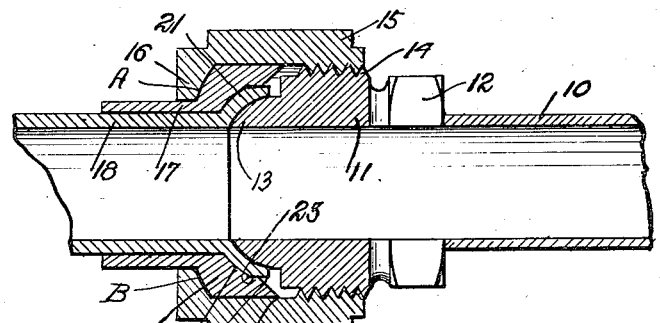
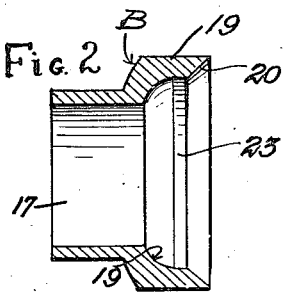
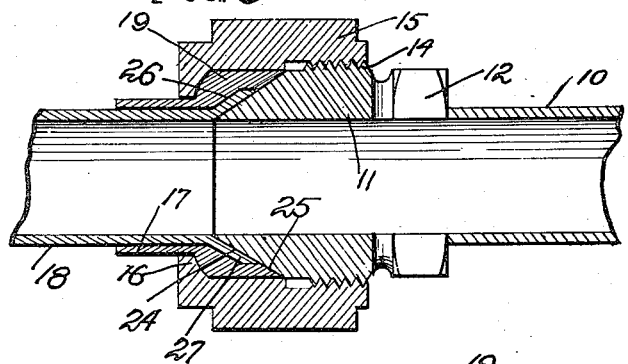
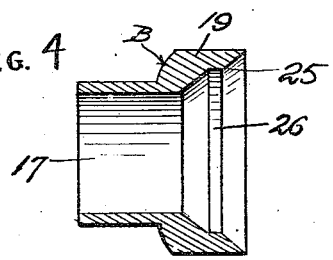
INVENTOR.
Le Roy Vaught
BY Carlos G. Stratton
ATTORNEY Patented Dec. 24, 1946

2,413,089

UNITED STATES PATENT OFFICE 2,413,089

FITTING

Le Roy Vaught, Inglewood, Calif., assignor of one-half to Roy W. Solomon, Inglewood, Calif.

Application July 10, 1944, Serial No. 544,155

1 Claim. (Cl. 285—86)

My invention relates to a means for producing an effective seal in transmitting lines used in the arts and industries for delivering fluids under high pressure. In the aeronautical field especially, it is of the greatest importance that fluid tight and leak-proof connections be available, that they be maintained at all times and under the various and severe conditions in which planes must operate and be handled, and that they be capable of withstanding extreme pressures without subjecting the connections to high torque pressure of a wrench.

Heretofore it has been customary to use rubber, fibre, wood, lead or other gaskets and devices interposed between the elements of a pipe joint using a union nut to produce a seal and to prevent injury to abutting surfaces by application of pressures that are too high. But the employment of these aids has not avoided the liability of damage to them when great wrench pressure is applied, nor has it yielded a satisfactory connection proof against leaks and capable of withstanding high pressure. Where the flaring type of tubing is used, the high torque resulting from the use of a wrench to insure a tight connection has so injured the flare by rupturing it or cracking it or damaging it otherwise that it is unable to hold pressure and prevent leaks.

This invention relates to a fluid seal or pipe connection in which two associating parts may have a metal to metal contact to insure a seal under very high pressures. The invention is applicable chiefly to that type of tubing now almost generally used in aircraft in which the end to be united in and by a union with a conduit is flaring.

One of the chief objects of this invention is to provide a simple fitting in which a seal between the joint may be effected and the joint tightened to a leak-proof pressure with a low wrench torque and without he use of gaskets or washers.

Another object of this invention is to provide a simple and efficient seal for fluids in pipe or conduit connections in which the seal is effected by a metal to metal contact and in which the seal is proof against rupture or disturbance by internal pressure and requires no excessive wrench pressure to associate it in a line.

My invention also has for its objects to provide such means that are positive in operation, convenient in use, easily installed in a working position and easily disconnected, economical of manufacture, simple and of general superiority and serviceability.

The invention also comprises novel details and arrangement of parts which will appear more fully in the course of the following description. However, the drawing merely shows and the following description merely describes embodiments of the invention which are given by way of illustration, or example only.

In the drawing, like reference characters designate similar parts in the several views.

Fig. 1 is a sectional elevational view showing an embodiment of my invention.

Fig. 2 is a sectional elevation of a sleeve used in the embodiment of my invention.

Fig. 3 is a sectional elevational view of a modified form of embodiment of my invention, and Fig. 4 is a sectional view of a sleeve used in the modified form of my invention.

Referring in particular detail to the drawing, a union coupling connection forming the subject of the present invention and constituting the design now most generally followed in aircraft construction, is shown as comprising a tubular conduit 10 fitted or provided at one end with an axially bored body 11, having a nut portion 12 at one end, for a wrench or other member, a nose or rounding abutment 13, projecting beyond the other end of said body, and external threads 14. An internally hreaded union nut 15, engages the external threads 14 of said body 11 and by rotation is adjusted relatively to and on said body 11. The union nut 15 is provided at one end with an inwardly directed flange 16, the inner face of which is preferably dished or cupped, as seen at A and provides a seat for a tubular sleeve or thimble 17 that fits relatively loosely upon or over a conduit element 18 which is complementary to the said tubular conduit 10 with which it is to be associated by connective pressure, as will appear later.

The sleeve or thimble 17 has a radially extending portion 19, of a diameter greater than the inside diameter of said inwardly directed flange 16 and of greater cross-sectional area than that of its tubular portion, providing thereby a portion of increased weight and strength and being thereby reinforced to withstand the pressure imposed upon it. The outer face of the portion 19 is curved or rounded, as seen at B and conforms to the shape and outline of the dished or cupped inner face A of the inwardly directed flange 16 of the nut 15. The upper or inner face of said portion 19 is provided with an annular recess 19' inward from the exterior of said radially extending portion 19, and the upper edge of said portion 19 is preferably inwardly beveled, as seen at 20.

The conduit element of any suitable material capable of withstanding high pressures, such as brass, copper, steel, or alloys, and that may readily be flared, is formed or provided at one end with a flare or outwardly spread radially extended portion 21, the outer face of which is shaped to fit exactly the recess 19' in the radially extending portion 19 of the sleeve or thimble and the inner face of which conform as exactly to the outline or contour of the nose or projection 13 of the body 11, which, as stated, is part of the tubular conduit 10. By manipulation of the union nut 15 or by wrench-operation thereof, said nut is adjusted on the body 11 and during such adjustment, the thrust seat A on the inwardly directed flange 16, engaging the outer face B of the radially extending portion 19 of the thimble or sleeve 17, moves it, together with the flared end 21 of the conduit element 18, which is seated in the recess 19', and which flared end is thereby brought into abutting connection with the projection 13 of the tubular conduit 10.

In Fig. 1 it will be noted that the free end of the flare or outwardly extended radial portion 21 of the conduit element which, as seen, is in the shape of a spherical concavity, extends beyond the inner line of the bevel 20, in which the portion 19 of the thimble 17, terminates, and that the exterior of the extended portion 22 is parallel with the longitudinal axis of the conduit 10 and its companion element 18. Similarly, the corresponding concavity of the tubular sleeve or thimble 17, which receives the flare of the conduit element 18, is formed with an internal annular wall 23, between its concavity and its beveled edge 20, and this internal annular wall 23 corresponds with the external diameter of the extended portion 22 and provides a perfect metal to metal fit and seal therebetween, which is augmented by the extended portion 22, which under pressure is forced outwardly the more intimately to engage and aline with the internal annular wall 23 of the thimble or sleeve.

Since the outside face of the flare 21 of the conduit element 18 is fitted exactly into the recess 19' in the thimble portion 19, and the inner face conforms exactly to the contour of the projection 13 on the tubular conduit, the connection pressure will insure a tight, leakproof joint, without any danger or liability of rupturing or otherwise injuring the flare.

It will also be observed that by this construction, none but a true axial alinement of the complementary parts forming the union is possible, that they are self seating, and that for this reason, the face to face contact of the metal surfaces is a positive insurance for a perfect seal and a protection against distortive action of a wrench or other member used to combine the associable elements.

The modified structure shown in Fig. 3 is in all major respects identical with that described in connection with Fig. 1. It differs from that form in that the body 11 of the tubular conduit 10, is provided with a conical projection 24, and that the sleeve or thimble is provided with a radially extending portion which has a tapering annular surface 23, that is provided with a recess 24. The flare 25 of the conduit element 18 is conical and fits exactly into the recess. When so seated, the outer face of the flare is flush with the outer face of the radially extending portion 19 of the thimble or sleeve 17 and presents a smooth and uninterrupted face for connection abutment with the cone projection of the tubular conduit.

While I have illustrated and described what I now regard as the preferable embodiments of my invention, the constructions are of course subject to modification, without departing from the spirit and scope of my invention. I, therefore, do not wish to restrict myself to the particular forms of construction illustrated and described, but desire to avail myself of all modifications that may fall within the scope of the appended claim.

Having thus described my invention, what I claim and desire to secure by Letters Patent is:

A union connection for a tubular conduit comprising in combination with an internally threaded nut having at one end thereof an inwardly directed flange, a tubing associated with said conduit and having a flaring end of greater diameter than the inside diameter of said flange, and an element on said tubing having a flared end corresponding to the flare of said tubing, said flared end having an annular recess in the face thereof to receive and seat the flared end of said tubing flush with the flared end of said element and form a seal against high pressure when the flared end of said tubing is moved into abutting engagement with said tubular conduit by said nut.

LE ROY VAUGHT.